(12) United States Patent
Hartmann

(10) Patent No.: US 7,310,880 B2
(45) Date of Patent: Dec. 25, 2007

(54) SABER SAW WITH AN ADJUSTING DEVICE FOR A SABER SAW GUIDE

(75) Inventor: Markus Hartmann, Mauerstetten (DE)

(73) Assignee: Hilti Aktiengesellschaft, Schaan (LI)

( * ) Notice: Subject to any disclaimer, the term of this patent is extended or adjusted under 35 U.S.C. 154(b) by 242 days.

(21) Appl. No.: 10/820,352

(22) Filed: Apr. 8, 2004

(65) Prior Publication Data

US 2004/0200078 A1 Oct. 14, 2004

(30) Foreign Application Priority Data

Apr. 11, 2003 (DE) ................. 103 16 631

(51) Int. Cl.
*B23D 49/16* (2006.01)
*B25F 5/02* (2006.01)

(52) U.S. Cl. ............................ 30/377; 30/392; 30/517; 16/421; 279/77; 279/79

(58) Field of Classification Search ................. 30/182, 30/374, 517, 392, 377, 393, 394; 29/280, 29/282; 74/551.9; 16/421; 81/132; 279/77–80
See application file for complete search history.

(56) References Cited

U.S. PATENT DOCUMENTS

| | | | | |
|---|---|---|---|---|
| 83,410 A | * | 10/1868 | Richards | 81/35 |
| 868,812 A | * | 10/1907 | Ruegg | 279/89 |
| 986,761 A | * | 3/1911 | Roscoe | 279/77 |
| 998,318 A | * | 7/1911 | Young | 403/327 |
| 1,076,971 A | * | 10/1913 | Geiger | 279/80 |
| 1,753,441 A | * | 4/1930 | Morehouse | 81/132 |
| 1,984,430 A | * | 12/1934 | Reed | 451/517 |
| 2,371,901 A | * | 3/1945 | Livermont | 81/477 |
| 2,663,291 A | * | 12/1953 | Hall | 124/17 |
| 5,421,091 A | * | 6/1995 | Gerritsen, Jr. | 30/377 |
| 5,664,792 A | * | 9/1997 | Tseng | 279/77 |
| 5,931,065 A | * | 8/1999 | Jackson et al. | 81/177.2 |
| 5,992,540 A | * | 11/1999 | Smolinski et al. | 173/169 |
| RE37,190 E | * | 5/2001 | Stowell et al. | 16/422 |
| 6,272,757 B1 | * | 8/2001 | Roe | 30/377 |
| 6,317,988 B1 | | 11/2001 | Tachibana et al. | |
| 6,523,267 B1 | * | 2/2003 | Osada et al. | 30/517 |
| 6,547,015 B1 | * | 4/2003 | Nowak et al. | 173/169 |

\* cited by examiner

*Primary Examiner*—Boyer D. Ashley
*Assistant Examiner*—Edward Landrum
(74) *Attorney, Agent, or Firm*—Abelman, Frayne & Schwab

(57) ABSTRACT

A motor-driven saber saw includes a housing (4), having a neck (8) which serves as a handle and has a tool opening (6), a guide device (22) for guiding the saber saw (2) on a workpiece and releasably connectable to the housing (4) in a region of the housing neck (8) and including a connection device (21) for connecting the guide device (22) to the housing (4), the housing (4) having connecting receptacles (18) for guiding the connection device (21), an adjusting device (30) mountable on the connection receptacles (18) for securing the connection device (21) to the housing, and a rectilinear spring member (36) for biasing the adjusting device (30) to a locking position and extending substantially in a longitudinal direction of the housing neck (8).

7 Claims, 3 Drawing Sheets

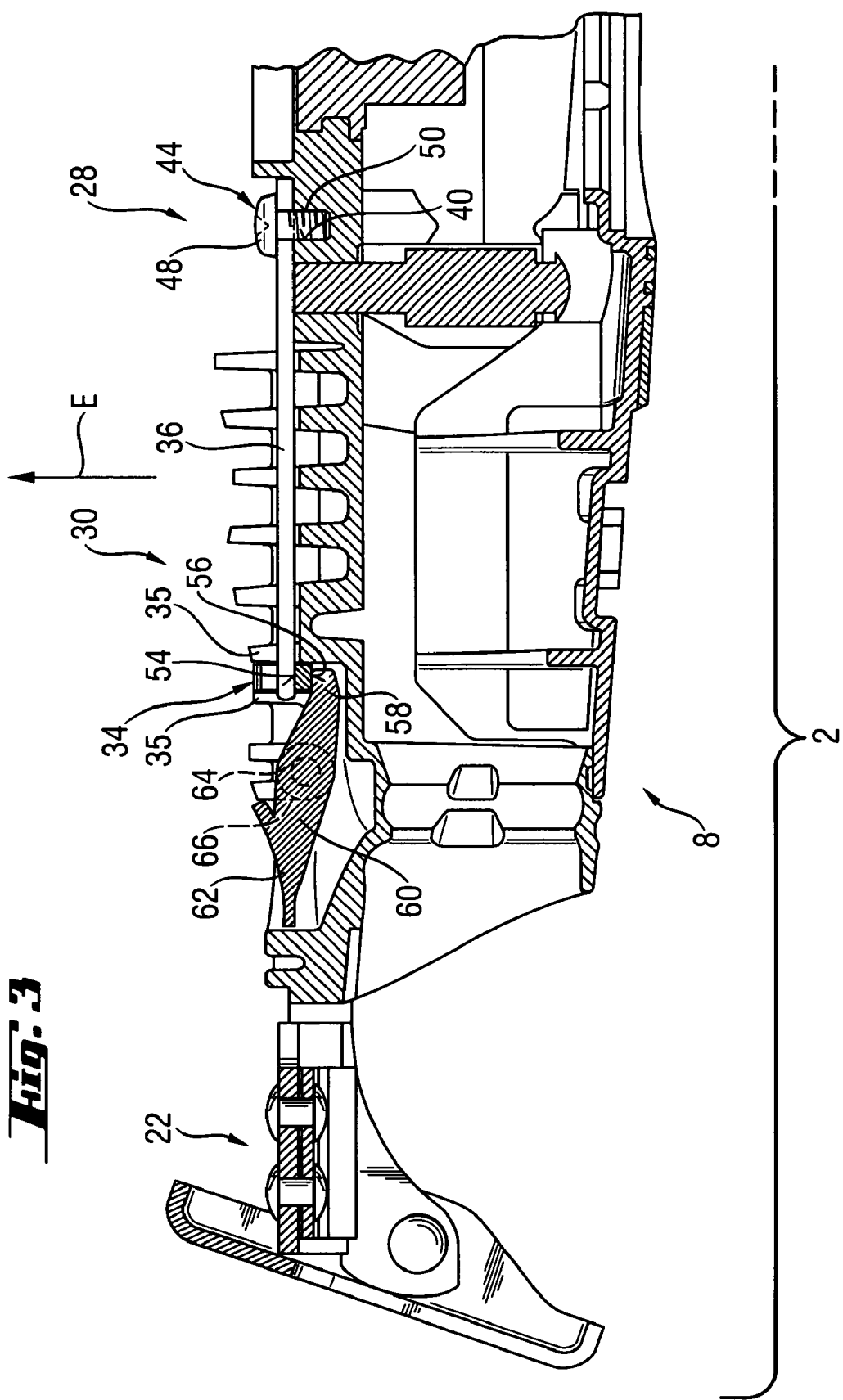

SABER SAW WITH AN ADJUSTING DEVICE FOR A SABER SAW GUIDE

BACKGROUND OF THE INVENTION

1. Field of the Invention

The present invention relates to a motor driven saber saw including a housing having a neck that serves as a handle and has a tool opening, a guide for guiding the saber saw on a workpiece and releasably connectable to the housing in a region of the neck, the guide including a connection element for connecting the guide to the housing, with the housing having a connection receptacle for guiding the connection element, and an adjusting device mountable on the connection receptacle for securing the connection element to the housing and spring-biased to its locking position.

2. Description of the Prior Art

Known saber saws can usually be equipped with a guide such as a guide shoe or a tubular adapter in order to achieve a reliable and precise guidance of the saber saw on the workpiece. The guide permits to achieve a precise cut on the workpiece having at least regionwise a flat or round cross-section.

U.S. Pat. No. 5,421,091 discloses a saber saw having a housing, a guide shoe for guiding the saber saw on a workpiece, and a pendulum-driven, with a motor, plunger. The guide shoe is pivotally supported at an end of a connection rail provided with an elongate recess, with the connection rail being guided in a substantially rectangular rail guide provided in the saw housing. For securing the connection rail on the saber saw, there is provided a locking member displaceable in a recess formed in the saw housing and extending transverse to the rail guide. The locking member is pressed against the guide rail with a helical spring arranged in the same recess as the locking member. The locking member engages, in its non-actuated condition, toothing provided on the connection rail. For adjusting the position of the guide shoe and releasing the guide shoe, the locking member is pressed against the helical spring, so that it becomes disengaged from the connection rail toothing.

U.S. Pat. No. 6,317,988 discloses a saber saw having a guide shoe for guiding the saber saw on a workpiece, and in which the connection rail of the guide shoe is detached from the housing by a release of a clamping lever supported on the housing, and is brought into another position. Upon the connection rail being brought into another position, the clamping lever is again secured on the housing, with the clamping lever acting on a leaf spring that biases the connection rail, which now occupies a new position, against the housing, securing the connection rail to the housing.

A drawback of both known solutions of securing the connection element of the guide shoe to the housing consist in that the securing means requires a relatively large mounting space. This is unacceptable because the adjusting device is located inside the housing neck that serves as a handle during the operation. A large cross-section of the housing neck often results in a very bad handle ergonomy.

The conventional adjusting devices have a relatively expensive construction, or they can only be mounted in a housing that is expensive to produce. In both cases, the result is high manufacturing costs.

Accordingly, an object of the present invention is to provide a saber saw with a guide in which the drawbacks of the conventional saber saw are eliminated.

Another object of the present invention is to provide a saber saw with a guide in which the adjusting device occupies minimum space and which can be produced with relatively small manufacturing costs.

SUMMARY OF THE INVENTION

These and other objects of the present invention, which will become apparent hereinafter, are achieved by providing a rectilinear spring member for biasing the locking member to its locking position and which extends substantially in a longitudinal direction of the housing neck.

With such a spring member, a very flat mounting space is required for the adjusting device that flatly abuts the housing in the region of the housing neck. This permits to form the housing neck of the saber saw rather slim, which permits to provide a good handle ergonomy.

Preferably, the rectilinear spring member is formed as a bar with elastic characteristics, which results in small costs of the material.

Advantageously, all of the support regions of the adjusting device on the housing and the housing have a common release direction. This permits to form at least a section of the housing, on which the adjusting device is supported, rather simple so that it can be formed by a die casting process. This permits to dispense with expensive shoving or a second machining treatment, which noticeably reduces manufacturing costs. In addition, with a single release direction, the assembling of the saw is simplified.

According to a particular advantageous embodiment of the present invention, the adjusting device is secured on the housing with a single fastening element. This makes possible a particularly simple mounting of the adjusting device on the housing, which against reduces the manufacturing costs.

Advantageously, the fastening element is formed as a screw which, together with a rib provided on the housing, form a clamping device for securing the spring member which again insures a cost-effective and simple mounting of the adjusting device.

Advantageously, the adjusting device includes a locking member which is provided on a housing side and which extends in the locking position of the adjusting device through a housing opening and engages the connection means, and a rocking member having an actuation element at one of its ends an adjusting element at another, opposite of its ends and that upon the actuation element being pressed in a direction toward the housing side, displaces the locking member in a direction away from the housing side. This also noticeably reduces mounting of the adjusting device as all of its parts can be manually secured on the corresponding side of the housing from outside. This also insures an easy handling of the adjusting device.

Further, the rocking member, preferably, is located in a support receptacle limited by the housing and a hand-protecting member securable thereon. In this way, the securing of the hand-protecting member on the housing provides for a long-lasting pivotal support of the rocking member on the housing, without a need in further attachment means, which again simplifies mounting of the adjusting device.

It is advantageous when the hand-protecting member has a flexible region that in a mounted condition of the hand-protecting member lies on the actuation element of the rocking member. Such a flexible region can be formed by reducing the thickness of material in this region in comparison with other regions of the hand-protecting member or by using a lighter material for forming this region. In this way, in addition to sealing the drive against soiling from outside, a simple and reliable actuation of the adjusting device is insured.

Advantageously, the flexible region has a rippled surface. This permits the operator, by using a sense of touch, to select the position of the flexible region and that of the actuation element, which improves handling of the adjusting device.

The novel features of the present invention, which are considered as characteristic for the invention, are set forth in the appended claims. The invention itself, however both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 3 a cross-sectional view along line III-III in FIG. 2.

DETAILED DESCRIPTION OF THE PREFERRED EMBODIMENT

Figure 1:
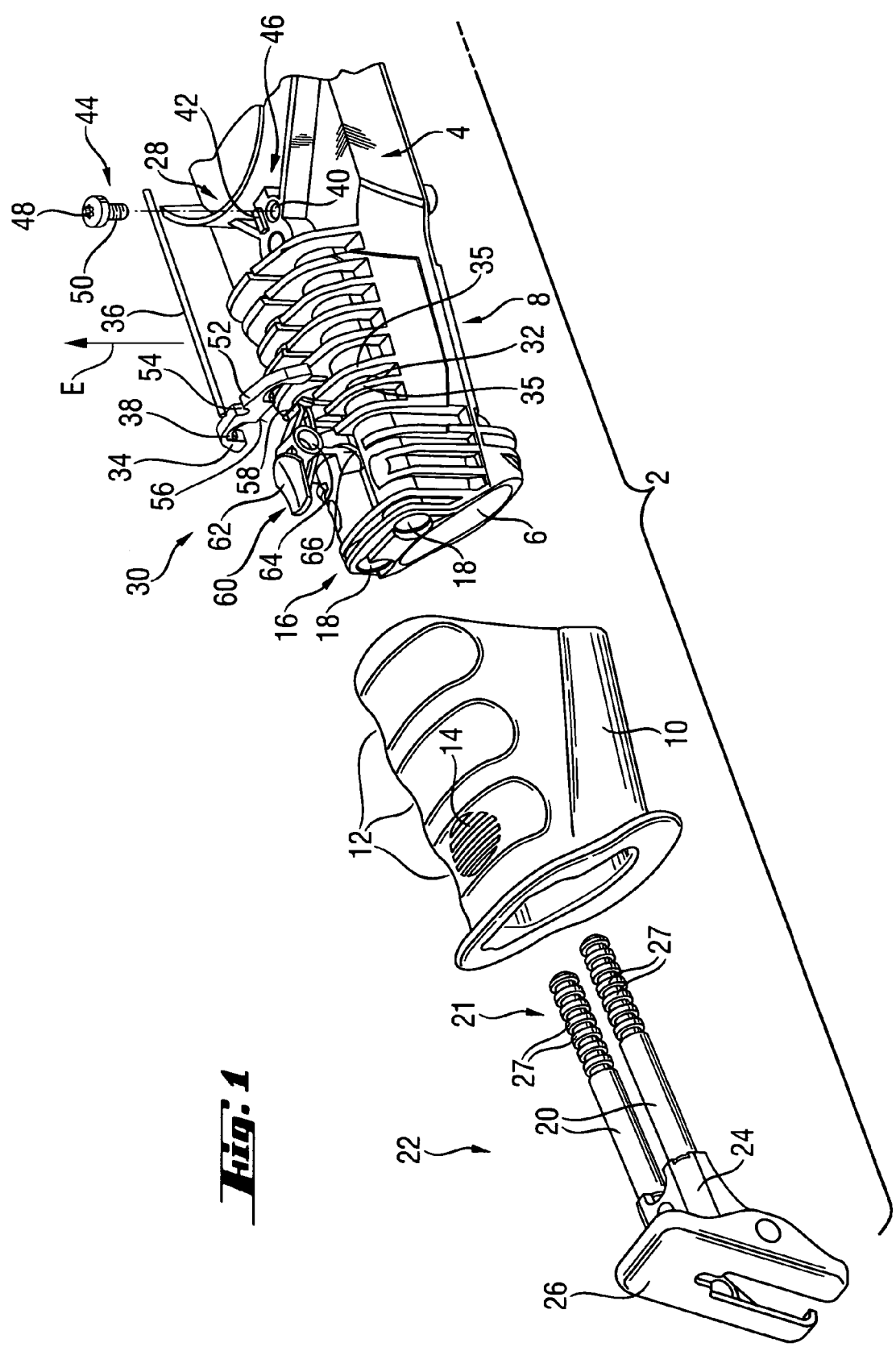
FIG. 1 an exploded view of a bottom of a front section of a saber saw according to the present invention, together with a guide device and a hand-protecting member.
Figure 2:
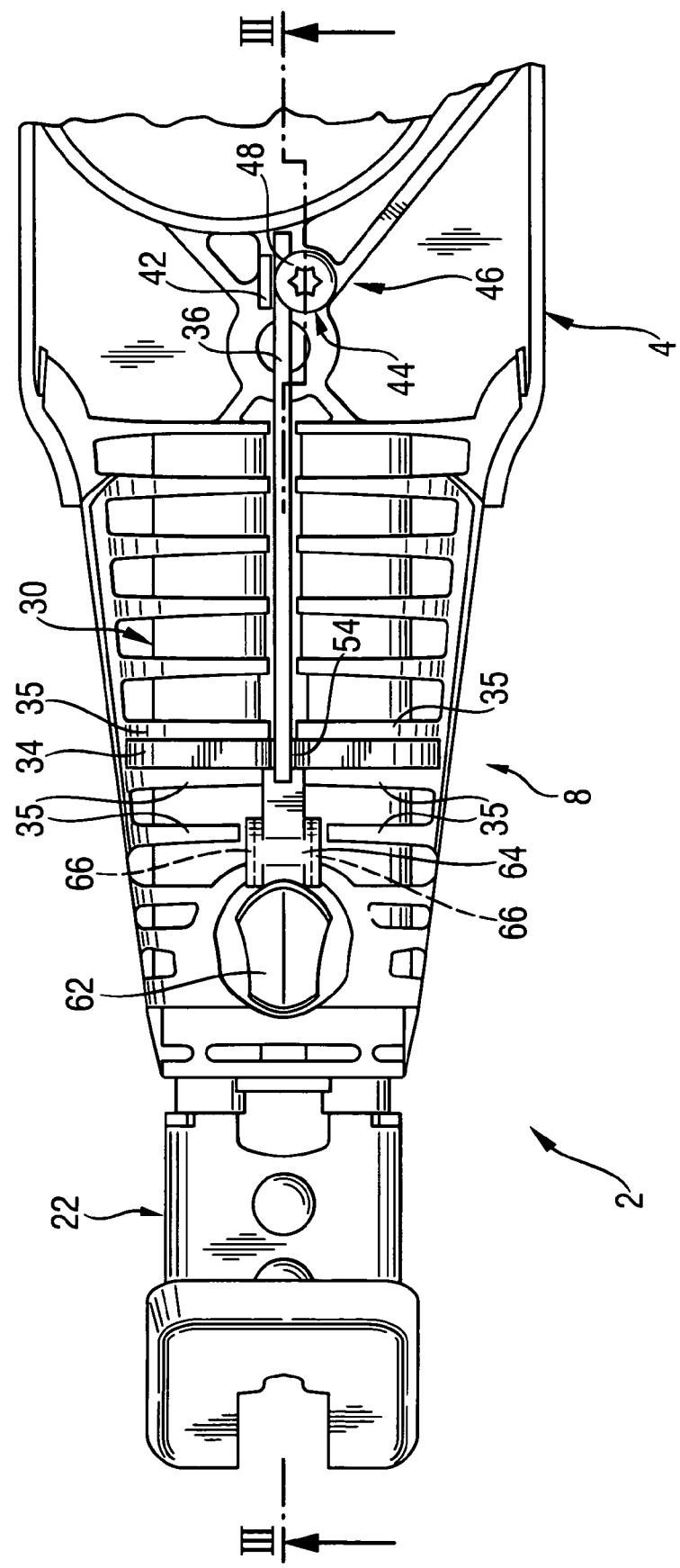
FIG. 2 a bottom view of the bottom of the front section shown in FIG. 2 with the hand-protecting member being removed.

A motor-driven saber saw 2 according to the present invention, a front section of which is shown in FIGS. 1-3, includes a housing 4 provided with a neck 8 extending to an opening 6 through which during an operation, a push rod (not shown), together with a saw blade secured thereto, reciprocates. The neck 8 is used as a handle during the operation of the saber saw 2.

With the neck 8 being used as a handle, during the assembly of the sable saw 2, a hand-protecting member 10 is pushed over the neck 8. The hand-protecting member 10 is adapted to a hand of a human to a most possible extent. To this end, the hand-protecting member 10 is provided on its surface with finger troughs 12 which predetermine, to a most possible extent, the position of a hand holding the neck 8 during the operation. In the frontmost finger through 12 in which the forefinger of an operator is received, there is provided a flexible region 14 with a rippled surface. The rippled surface is formed by a plurality of parallel groove-shaped recesses which insure that the hand-protecting member 10 has, in the rippled region 14, more elastic characteristics than in the remaining portion of the hand-protecting member 10.

In addition to the tool opening 6, the housing 4 has a connecting device 16 in the form of two receiving receptacles 18 formed in the housing 4. The receiving receptacles 18 have a circular cross-section. Two rod-shaped connection members 20 of a connection device 21 of a guide 22 are received in the receiving receptacles 18. A connection web 24 connects the two rod-shaped connection members 20 with a guide shoe 26 which is pivotally secured on the connection web 24. The two rod-shaped connection members 20 have, at their ends remote from the connection web 24, a plurality of locking constrictions 27.

At the bottom side 28 of the housing 4, there is further provided an adjusting device 30. The adjusting device 30 secures the connection device 21 in the connecting device 16. To this end, on the bottom side 28, there are provided openings 32 connected with respective receiving receptacles 18. A locking member 34 of the adjusting device 30 is displaced transverse to the receiving receptacle 18 at the openings 32. The locking member 30 is supported displaceable between two guide ribs 35 of the housing 4.

The locking member 34 is biased in the direction of the receiving receptacles 18 by a rectilinear, bar-shaped spring member 36. In its unloaded condition, the adjusting device 30 occupies a locking condition at which locking elements 38 of the locking members 34 project through respective openings 32 into the receiving receptacles 18.

For securing the rectilinear spring member 36, on the bottom side 28 of the housing 4, there is provided, adjacent to a housing rib 42, a threaded receptacle 40. The housing rib 42 forms, with a screw 44 screwed into the receptacle 40, a clamping device 46. During the assembly of the saber saw 2, the spring member 36 is placed with its end on the housing rib 42, and the screw 44 is screwed into he threaded receptacle 40. In this way, the end of the spring member 36 is clamped between the housing 4, the housing rib 42, the screw head 48, and the screw stem 50. The spring member 36 occupies, in its clamping position, a position in which it extends parallel to the housing neck 8, as can be seen in FIG. 2.

Alternatively, to screwing the of the screw 44 in the threaded receptacle 40, it is possible to screw a self-cutting screw directly into the housing 4. The end of the spring member 36, remote from the clamping device 46, is received in an engagement tough 54 provided in the upper side 52 of the locking member 34. An adjusting element 58 of a rocking member 60 engages a bearing surface 56 located opposite the engagement trough 54. The adjusting element 58 is provided at an end of the rocking member 60 remote from the tool. The end of the rocking member 60 adjacent to the tool forms an actuation element 62 that is formed as a button. Between the adjusting element 58 and the actuation element 62, the rocking member 60 has an approximate sleeve-shaped pivotal element 64.

During mounting of the adjusting device 30, first, the pivotal element 64 of the rocking member 60 is placed in a correspondingly formed support receptacle 66 which is provided on the bottom side 28 of the housing 4. Then, the locking member 34 is set between the two guide ribs 35, with the bearing surface 56 of the locking member 34 abutting the adjusting element 58 of the rocking member 60. Thereafter, the end of the spring member 36 is placed in the engagement trough 54 of the locking member 34, with the opposite end of the sprig member 36 being placed against the housing rib 42. Finally, the spring member 36 is clamped with the screw 44, as it has been discussed above. As soon as the spring member 36 is clamped by the clamping device 46, the entire adjusting device 30 becomes secured on the housing 4. The screw 44 forms, thus, a single fastening element with which the adjusting device 30 is secured on the housing 4.

The support of the adjusting device 30 on the housing 4 is so effected that the threaded receptacle 40, the guide ribs 35, and the support receptacles 66 and, thereby, all of the support regions of the adjusting device 30 are oriented in a direction corresponding to a main removal direction E of the adjusting device 30 from the housing 4.

After the adjusting device 30 has been mounted, the hand-protecting member 10 is pushed over the housing neck 8 and the adjusting device 30, with the flexible region 14 being placed directly above the actuation element 62 of the rocking member 60. In addition, the hand-protecting member 10 forms, together with the support receptacles 66, a support for rotatably supporting the pivotal element 64 of the rocking member 60 on the housing 4.

In order to secure the guide device 22 on the saber saw 2, an operator presses, with the forefinger, the flexible region 14 of the hand-protecting member 10. Thereby, the actuation element 62 of the rocking member 60 is pressed against the bottom side 28 of the housing 4, and the adjusting element 58 simultaneously moves away from the bottom side 28 and applies pressure against the bearing surface 56 of the locking member 3, displacing the locking member 34 against the biasing force of the spring member 36. Thereby, the locking member 34 is displaced form the receiving receptacles 18, and the locking elements 38 move out of the receiving receptacles 18. The adjusting device 30, as a result, now occupies a release position in which the connection members 20 can be inserted into the connecting device 16.

As soon as a predetermined distance of the guide shoe 26 from the housing 4 is reached, the operator releases the pressure on the flexible region 14 of the hand-protecting member 10 and, thereby, on the actuation element 62 of the locking member 34. As a result, a biasing force of the spring member 36 displaces the locking member 34 and its locking elements 38 through the openings 32 and into the receiving receptacle 18. The locking elements 38 engage a respective locking construction 27. This provides for securing the connection device 21 and, as a result, the entire guide device to the housing 4 in a desired position.

Though the present invention was shown and described with references to the preferred embodiment, such is merely illustrative of the present invention and are not to be construed as a limitation thereof and various modifications of the present invention will be apparent to those skilled in the art. It is, therefore, not intended that the present invention be limited to the disclosed embodiment or details thereof, and the present invention includes all variations and/or alternative embodiments within the spirit and scope of the present invention as defined by the appended claims.

What is claimed is:

1. A motor-driven saber saw (2), comprising a housing (4) having a neck (8) that serves as a handle and has a tool opening (6);
   guide means (22) for guiding the saber saw (2) on a workpiece and releasably connectable to the housing (4) in a region of the neck (8), the guide means (22) including connection means (21) for connecting the guide means (22) to the housing (4), the neck (8) of said housing (4) having connecting means (16) for guiding the connection means (21); an adjusting device (30) mountable on the connecting means (16) of said neck (8) for securing the connection means (21) to the housing; and a rectilinear spring member (36) for biasing the adjusting device (30) to a locking position thereof and extending substantially parallel to a longitudinal direction of the housing neck (8), said spring member (36) being formed as a springy bar, wherein the neck region (8) of the housing (4) has support regions (35, 40, 66) for the adjusting device (30) and is formed by a die casting process, said support regions including a pair of rib guides (35) for receiving a locking member (34) that is retained therebetween by said spring member (36), said locking member (34) releasably engaging said connection means (21) of said guide means (22), and all of the support regions (35, 40, 66) of the adjusting device (30) on the housing (4) are oriented in a direction corresponding to a common release direction (E) of the adjusting device (30) from the housing (4), whereby formation of at least a section of the housing (4), on which the adjusting device (30) is supported, by the die casting process is insured.

2. A motor-driven saber saw according to claim 1, wherein the adjusting device (30) is secured on the housing (4) with a single fastening element.

3. A motor-driven saber saw according to claim 2, wherein the fastening element comprises a screw (44) which, together with a rib (42) provided on the housing (4), form clamping means (46) for securing the spring member (36).

4. A motor-driven saber saw according to claim 1, wherein the adjusting device (30) comprises said locking member (34) which is provided on a housing side (28) and which extends in the locking position of adjusting device (30) through a housing opening (32) and engages the connection means (21); and a rocking member (60) having an actuation element (62) at one end thereof and an adjusting element (58) at another, opposite end thereof that upon the actuation element (62) being pressed in a direction toward the housing side (28), displaces the locking member (34) in a direction away from the housing side (28).

5. A motor-driven saber saw according to claim 4, further comprising a hand-protecting member (10) securable on the housing (4), and wherein the rocking member (60) is located in a support receptacle limited by the housing (4) and the hand-protecting member (10).

6. A motor-driven saber saw according to claim 5, wherein the hand-protecting member (10) has a flexible region that in a mounted condition of the hand-protecting member (10) lies on the actuation element (62) of the rocking member (60).

7. A motor-driven saber saw according to claim 6, wherein the flexible region (14) has a rippled surface.

* * * * *